WITNESSES:
John E. Healy
Wm. B. Sellers.

INVENTOR
James H. Sprow.
BY [signature]
ATTORNEY 2,780,685
Patented Feb. 5, 1957

2,780,685

INTERLOCKING MECHANISM

James H. Sprow, East McKeesport, Pa., assignor to Westinghouse Electric Corporation, East Pittsburgh, Pa., a corporation of Pennsylvania Application August 11, 1953, Serial No. 373,477

12 Claims. (Cl. 200—50)

My invention relates, generally, to interlocking mechanisms and, more particularly, to interlocks for enclosed switchgear apparatus.

For some applications, it is necessary to so interlock two switches that both switches cannot be closed at the same time. When the two switches are enclosed in one cabinet, it has been the usual practice to provide two separate interlocking devices. One device so interlocked the shafts of the two switches that only one switch could be in the closed position at one time. The other device operated in a manner to require that both switches be open before the cabinet door could be opened.

An object of my invention, generally stated, is to provide an interlocking mechanism for enclosed switchgear apparatus which shall be simple and efficient in operation and which may be economically manufactured and installed.

Another object of my invention is to provide a simple interlocking mechanism which will perform the functions that previously required two separate mechanisms.

A more specific object of my invention is to provide an interlocking mechanism which will control the operation of two switches and the opening of the door of the cabinet enclosing the switches.

A further object of my invention is to simplify the operation and increase the safety of an interlocking mechanism for switchgear apparatus.

Other objects of my invention will be explained fully hereinafter or will be apparent to those skilled in the art.

In accordance with one embodiment of my invention, the operating shafts of two switches are so interlocked through a semi-floating plate that only one switch can be closed at a time. A pivoted interlocking bar is actuated by the plate to prevent the door for the switch housing from being opened if either switch is closed. When both switches are open, the door can be opened.

For a better understanding of the nature and objects of the invention, reference may be had to the following detailed description, taken in conjunction with the accompanying drawing, in which.

Figure 1:
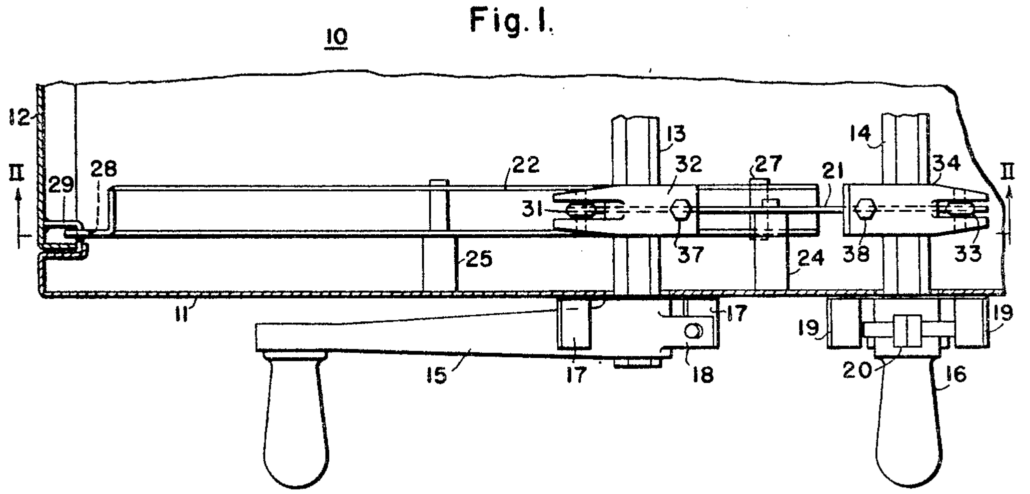
Figure 1 is a view, partly in plan and partly in section, of a portion of a switchgear structure embodying the principal features of the invention.

Referring to the drawing, the structure shown therein comprises a portion of a housing 10 having a side wall 11 and an openable door 12. In accordance with the usual practice, the housing 10 may be composed primarily of sheet metal. The housing 10 is utilized to protect a pair of electric switches (not shown) which may be of a type, such as disconnect or transfer switches, well known in the electrical art.

One of the switches has an operating shaft 13 and the other switch has an operating shaft 14. The shafts are rotatably mounted in suitable bearings provided in the housing, and they may be actuated by any suitable means to operate their respective switches to open and closed positions. In the present instance, the shaft 13 is rotated by a handle 15 attached to one end of the shaft which extends through the side wall 11 of the housing 10. The shaft 14 is rotated by a handle 16 which is attached to one end of the shaft 14. Stop members 17 are secured to the side wall 11 to engage a projection 18 on the handle 15 to limit the rotation of the shaft 13. Similar stop members 19 are attached to the side wall 11 to limit the rotation of the shaft 14 by engaging projection 20 on handle 16.

As explained hereinbefore, it is frequently desirable to so interlock the switches operated by the shafts 13 and 14 that only one switch can be closed at a time. It is also desirable to provide interlocking means for preventing the door 12 from being opened when either one of the switches is closed. Heretofore, the interlocking functions have been performed by two separate interlocking devices or mechanisms. In order to simplify the operation of and reduce the number of parts required for the interlocking mechanism, I have devised the present interlocking mechanism which performs both of the foregoing interlocking functions.

Figures 2, 3:
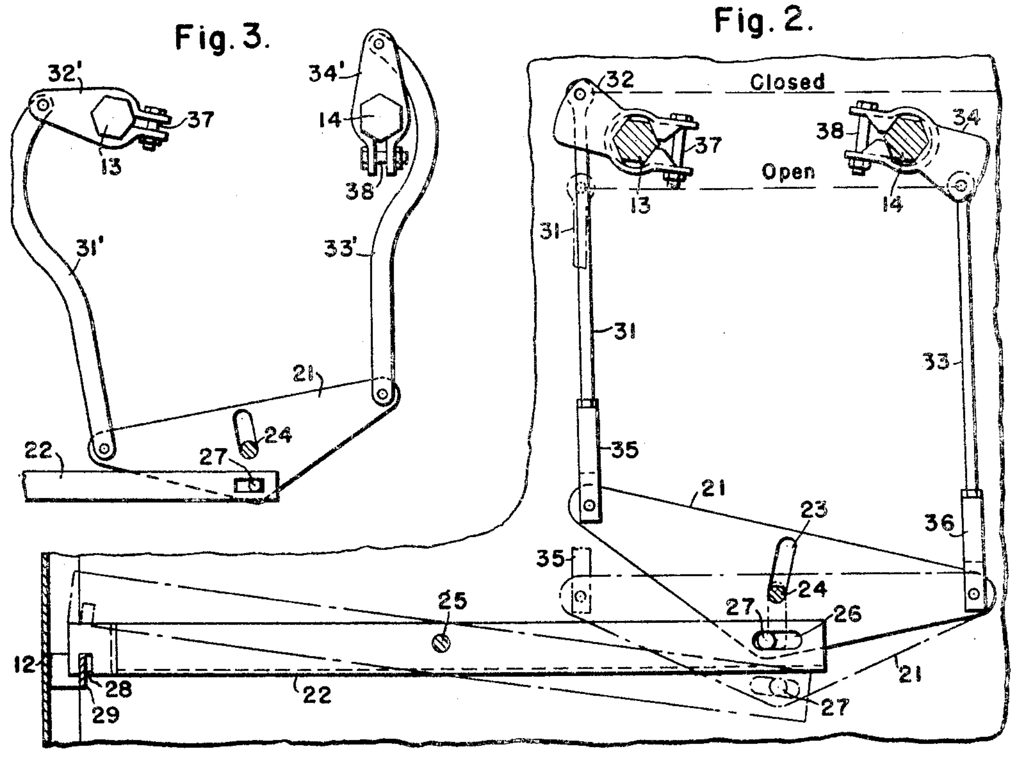
Fig. 2 is a view, partly in elevation and partly in section of the structure shown in Fig. 1, the section being taken along the line II—II in Fig. 1.
Fig. 3 is a view of a portion of the structure showing a modification of the invention.

As shown more clearly in Fig. 2, the interlocking mechanism comprises a semi-floating interlocking plate 21 and an interlocking bar 22. The plate 21 has an elongated slot 23 therein for receiving a pin 24 which is secured to the side wall 11 of the housing 10. The bar 22 is pivotally mounted on a pin 25 which is also secured to the side wall 11. One end of the bar 22 has an elongated slot 26 therein for receiving a pin 27 which is carried by the plate 21. The other end of the bar 22 has a notch 28 therein for engaging a latch 29 secured to the door 12.

As shown in Fig. 2, the plate 21 is generally triangular in shape, and one corner of the plate is connected to the shaft 13 through a connecting rod 31 and a crank arm 32. Another corner of the plate 21 is connected to the shaft 14 through a connecting rod 33 and a crank arm 34. The pin 27 is disposed at the third corner of the triangular plate 21, and the slot 23 is disposed substantially midway between the connecting points for the rods 31 and 33.

As shown, the connecting rods 31 and 33 may be adjusted in length by means of threaded coupling members 35 and 36 attached to the ends of the rods 31 and 33, respectively. As also shown, the crank arms 32 and 34 may be clamped around the shafts 13 and 14, respectively, by means of bolts 37 and 38.

As shown by the full lines in Fig. 2, the shaft 13 is in the position in which its switch is closed and the shaft 14 is in the position in which its switch is open. As also shown by the full lines, the interlocking bar 22 engages the latch 29 to prevent the door 12 from being opened. Since the pin 24 is at the lower end of the slot 23 in the plate 21, the shaft 14 cannot be rotated to the closed position without the shaft 13 being first rotated to the open position. Thus, the interlocking plate 21 prevents more than one of the switches operated by the shafts from being closed at the same time.

As shown by the broken lines in Fig. 2, when the shaft 13 is rotated to the open position, the plate 21 moves down in the slot 23 around the pin 24, thereby permitting both shafts to be in the open position at the same time. Furthermore, as the plate 21 moves downwardly, it carries the pin 27 downwardly, thereby actuating the bar 22 to disengage the latch 29 and permit the door 12 to be opened when both switches are open. However, if either the shaft 13 or the shaft 14 is rotated to the closed position, the plate 21 moves upwardly on the pin 24 and carries the pin 27 upwardly to cause the bar 22 to engage the latch 29 and prevent the door 12 from being opened.

As previously explained, when the plate 21 is moved to its uppermost position by rotating either the shaft 13 or the shaft 14 to its closed position, the other shaft cannot be rotated to its closed position without the first shaft being rotated to its open position. Furthermore, if an attempt should be made to rotate both shafts from their open position to their closed position at the same time, the plate 21 is moved to its uppermost position prior to the closing of either one of the switches and it is necessary to return one of the switches to its open position before the other switch can be closed. Accordingly, the desired interlocking functions are performed by the interlocking mechanism.

In the modification shown in Fig. 3, the connecting rods 31′ and 33′ and the crank arms 32′ and 34′ are so shaped and disposed that they are in toggle when their respective shafts are in the closed position, thereby providing additional means for preventing both switches from being closed at the same time. As shown, the rod 33′ and the arm 34′ are locked in toggle and the shaft 14 must be rotated by its crank to break the toggle before the shaft 13 can be rotated toward the closed position. Likewise, when the rod 31′ and the arm 32′ are in closed toggle, the shaft 13 must be rotated by its crank to break the toggle before the shaft 14 can be rotated toward the closed position.

From the foregoing description, it is apparent that I have provided an interlocking mechanism for electric switches, or other apparatus operated by rotatable shafts, which has a relatively small number of parts and which performs the interlocking function in a simple and positive manner. Since the present mechanism has a relatively small number of parts, there is less chance of the mechanism failing to perform properly. Furthermore, the cost of the mechanism is reduced and less operating effort is required than was required for the two or more separate devices previously provided to perform the functions performed by the present device.

Since numerous changes may be made in the above-described construction, and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In a switchgear structure, in combination, a housing having an openable door, a pair of switch operating shafts mounted in the housing and rotatable to open and closed positions, an interlocking plate having opposite ends connected to said shafts to prevent both shafts from being in the closed position at the same time, and a single interlocking bar actuated directly by said plate to prevent the door from being opened if either shaft is in the closed position, said bar being pivoted in the housing and having one end connected to the plate substantially midway between the ends which are connected to the shafts, said bar being actuated by the plate to permit the door to be opened when both shafts are in the open position.

2. In a switchgear structure, in combination, a housing having an openable door, a pair of switch operating shafts mounted in the housing and rotatable to open and closed positions, a semi-floating interlocking plate connected to said shafts to prevent both shafts from being in the closed position at the same time, and a pivoted interlocking bar having one end actuated by said plate to prevent the door from being opened if either shaft is in the closed position.

3. In a switchgear structure, in combination, a housing having an openable door, a pair of switch operating shafts mounted in the housing and rotatable to open and closed positions, a semi-floating interlocking plate connected to said shafts to prevent both shafts from being in the closed position at the same time, and a pivoted interlocking bar having one end actuated by said plate to prevent the door from being opened if either shaft is in the closed position, said bar being actuated by the plate to permit the door to be opened when both shafts are in the open position.

4. In a switchgear structure, in combination, a housing having an openable door, a pair of switch operating shafts mounted in the housing and rotatable to open and closed positions, a semi-floating interlocking plate connected to said shafts to prevent both shafts from being in the closed position at the same time, and a pivoted interlocking bar having one end actuated by said plate to prevent the door from being opened if either shaft is in the closed position, said plate being movable rectilinearly a predetermined distance to permit both shafts to be in the open position at the same time, and said bar being actuated by the plate to permit the door to be opened when both shafts are in the open position.

5. In a switchgear structure, in combination, a housing having an openable door, a pair of switch operating shafts mounted in the housing and rotatable to open and closed positions, a pivot pin fixed in the housing, an interlocking plate having a slot therein for said pin, said plate being connected to said shafts to prevent both shafts from being in the closed position at the same time, and an interlocking bar pivoted in the housing and having one end actuated by the plate to prevent the door from being opened if either shaft is in the closed position.

6. In a switchgear structure, in combination, a housing having an openable door, a pair of switch operating shafts mounted in the housing and rotatable to open and closed positions, a pivot pin fixed in the housing, an interlocking plate having a slot therein for said pin, said plate being connected to said shafts to prevent both shafts from being in the closed position at the same time, and an interlocking bar pivoted in the housing and having one end actuated by the plate to prevent the door from being opened if either shaft is in the closed position, said bar being actuated by the plate to permit the door to be opened when both shafts are in the open position.

7. In a switchgear structure, in combination, a housing having an openable door, a pair of switch operating shafts mounted in the housing and rotatable to open and closed positions, a pivot pin fixed in the housing, an interlocking plate having a slot therein for said pin, said plate being connected to said shafts to prevent both shafts from being in the closed position at the same time, and an interlocking bar pivoted in the housing and actuated by the plate to prevent the door from being opened if either shaft is in the closed position, said plate moving on said pin in said slot to permit both shafts to be in the open position at the same time, and said bar being actuated by said movement of the plate to permit the door to be opened when both shafts are in the open position.

8. In a switchgear structure, in combination, a housing having an openable door, a pair of switch operating shafts mounted in the housing and rotatable to open and closed positions, a pivot pin fixed in the housing, an interlocking plate having a slot therein for said pin, said plate being connected to said shafts to prevent both shafts from being in the closed position at the same time, and an interlocking bar pivoted in the housing and having one end connected to said plate, the other end of said bar being actuated by the plate to prevent the door from being opened if either shaft is in the closed position.

9. In combination, a housing having an openable door, a pair of operating shafts mounted in the housing and rotatable between two extreme positions, an interlocking plate having opposite ends connected to said shafts to prevent both shafts from being in one extreme position at the same time, an interlocking bar pivoted in the housing and having one end connected to the plate substantially midway between the ends which are connected to said shafts, said bar being actuated by said plate to prevent the door from being opened if either shaft is in said one extreme position, said plate being movable a predetermined distance to permit both shafts to be in the other extreme position at the same time, and said bar being actuated by said movement of the plate to permit the door to be opened when both shafts are in said other extreme position.

10. In combination, a housing having an openable door, a pair of operating shafts mounted in the housing and rotatable between two extreme positions, a pivoted interlocking plate for preventing both shafts from being in one extreme position at the same time, a crank arm attached to each shaft, a connecting rod connecting each crank arm to the interlocking plate, said crank arm and connecting rod for each shaft being in toggle when said shaft is in one of said extreme positions and out of toggle when the shaft is in the other extreme position, and an interlocking bar pivoted in the housing and actuated by the plate to control the opening of said door.

11. In combination, a housing having an openable door, a pair of operating shafts mounted in the housing and rotatable between two extreme positions, a pivoted interlocking plate for preventing both shafts from being in one extreme position at the same time, a crank arm attached to each shaft, a connecting rod connecting each crank arm to the interlocking plate, said crank arm and connecting rod for each shaft being in toggle when said shaft is in one of said extreme positions and out of toggle when the shaft is in the other extreme position, said plate being movable at its pivot point a predetermined distance to permit both shafts to be in the other extreme position at the same time, and an interlocking bar pivoted in the housing and actuated by the plate to control the opening of said door.

12. In combination, a housing having an openable door, a pair of operating shafts mounted in the housing and rotatable between two extreme positions, a pivoted interlocking plate for preventing both shafts from being in one extreme position at the same time, a crank arm attached to each shaft, connecting rods connecting said crank arms to the interlocking plate at opposite sides of its pivot point, the crank arm and the connecting rod for each shaft being in toggle when said shaft is in one of said extreme positions and out of toggle when the shaft is in the other extreme position, and an interlocking bar pivoted in the housing and having one end actuated by the plate to control the opening of said door.

References Cited in the file of this patent

UNITED STATES PATENTS

| | | |
|---|---|---|
| 1,306,345 | Krantz | June 10, 1919 |
| 1,306,347 | Krantz | June 10, 1919 |
| 1,349,818 | Coles | Aug. 17, 1920 |
| 1,741,227 | Frank | Dec. 31, 1929 |
| 2,328,801 | Hammell | Sept. 7, 1943 |
| 2,604,796 | Freese | July 29, 1952 |
| 2,612,789 | Bierenfeld | Oct. 7, 1952 |

FOREIGN PATENTS

| | | |
|---|---|---|
| 420,453 | Germany | Oct. 26, 1925 |
| 625,334 | France | Apr. 27, 1927 |
| 681,945 | Germany | Oct. 11, 1939 |